(12) United States Patent
Hain et al.

(10) Patent No.: US 9,140,304 B2
(45) Date of Patent: Sep. 22, 2015

(54) ROLLING BEARING ARRANGEMENT

(75) Inventors: Steffen Hain, Karlstadt (DE); Jörg Lange, Bremen (DE); Hans-Jürgen Liesegang, Schortens (DE); Dieter Plöβl, Bergrheinfeld (DE)

(73) Assignee: AKTIEBOLAGET SKF, Gothenburg (SE)

( * ) Notice: Subject to any disclaimer, the term of this patent is extended or adjusted under 35 U.S.C. 154(b) by 522 days.

(21) Appl. No.: 12/770,360

(22) Filed: Apr. 29, 2010

(65) Prior Publication Data

US 2011/0268379 A1 Nov. 3, 2011

(51) Int. Cl.

| F16C 19/50 | (2006.01) |
|---|---|
| F16C 33/66 | (2006.01) |
| F16C 19/52 | (2006.01) |
| F16C 33/80 | (2006.01) |
| F16C 35/07 | (2006.01) |
| H02K 5/136 | (2006.01) |
| H02K 5/173 | (2006.01) |

(52) U.S. Cl.
CPC .............. *F16C 33/6622* (2013.01); *F16C 19/52* (2013.01); *F16C 33/80* (2013.01); *F16C 35/07* (2013.01); *H02K 5/136* (2013.01); *H02K 5/1732* (2013.01)

(58) Field of Classification Search
CPC ...... F16C 19/52; F16C 33/6622; F16C 33/80; F16C 35/07; F16C 35/077; H02K 5/136; H02K 5/1732
USPC .................. 384/445, 462, 473–476, 490, 513
See application file for complete search history.

(56) References Cited

U.S. PATENT DOCUMENTS

| 2,352,206 | A | * | 6/1944 | Kendall ........................ 384/476 |
| 3,628,835 | A | | 12/1971 | Cornish et al. |
| 3,912,343 | A | * | 10/1975 | Paton et al. .................... 384/423 |
| 5,577,847 | A | * | 11/1996 | Nakamura et al. ............ 384/517 |
| 6,010,247 | A | * | 1/2000 | Mouri et al. ................... 384/517 |
| 6,030,128 | A | * | 2/2000 | Pontzer ......................... 384/476 |
| 6,443,623 | B2 | * | 9/2002 | Sugita et al. .................. 384/466 |
| 6,574,076 | B1 | * | 6/2003 | Koyama ..................... 360/265.3 |
| 6,995,955 | B2 | * | 2/2006 | Koyama ........................ 384/546 |

(Continued)

FOREIGN PATENT DOCUMENTS

| CH | 324513 A | 9/1957 |
| CN | 87215202 U | 12/1988 |

(Continued)

OTHER PUBLICATIONS

Translation of CH324513 obtained on 11/13/12.*

(Continued)

*Primary Examiner* — James Pilkington
(74) *Attorney, Agent, or Firm* — Bryan Peckjian; SKF USA Inc. Patent Dept.

(57) ABSTRACT

A roller bearing assembly includes at least one outer ring (16, 18) with an outer track (24, 26), which is surrounded on its outer side by an outer part (36), and at least one inner ring (20, 22) with an inner track (28, 30), which surrounds the inner part (52). The inner part (52) and the outer part (36) project axially beyond the inner ring (20, 22) and the outer ring (16, 18), so that an explosion prevention gap (62) is formed between the inner part (52) and the outer part (36). The explosion prevention gap (62) is at least substantially linear and cylindrical.

28 Claims, 2 Drawing Sheets

(56) References Cited

U.S. PATENT DOCUMENTS

| | | | |
|---|---|---|---|
| 2002/0102040 A1* | 8/2002 | Koiwa et al. | 384/474 |
| 2004/0066996 A1* | 4/2004 | Olsson et al. | 384/473 |

FOREIGN PATENT DOCUMENTS

| | | | |
|---|---|---|---|
| CN | 2038299 | U | 5/1989 |
| CN | 2574263 | Y | 9/2003 |
| CN | 2717522 | Y | 8/2005 |
| DE | 1881807 | U | 10/1963 |
| DE | 2149515 | A1 | 4/1972 |
| DE | 2151584 | A1 | 4/1973 |
| DE | 2901111 | A1 | 7/1980 |
| DE | 3804602 | A1 | 8/1989 |
| DE | 9309300 | U1 | 11/1994 |
| DE | 19546023 | A1 | 8/1996 |
| DE | 19826911 | A1 | 1/2000 |
| DE | 19908158 | A1 | 8/2000 |
| DE | 20217303 | U1 | 3/2004 |
| EP | 1443230 | A1 | 8/2004 |
| EP | 1981151 | A1 | 10/2008 |
| GB | 2199905 | A1 | 7/1988 |

OTHER PUBLICATIONS

Translation of DE20217303 obtained Aug. 13, 2013.*

* cited by examiner

ROLLING BEARING ARRANGEMENT

TECHNICAL FIELD

The present invention generally relates to a roller bearing assembly having an explosion prevention gap.

BACKGROUND ART

Roller bearing assembles are known that include an explosion prevention gap between a rotating shaft and a housing, e.g., for electric motors. The explosion prevention provided by the explosion prevention gap enables the operation of such an electric motor in an environment, in which explosive gases could develop. The explosion prevention gap prevents such gases from igniting due to arcing or sparking near the rotating shaft.

In order to prevent the transmission of sparks through an explosion prevention gap that is large, on the one hand, and in order to prevent spark generation in the area of the explosion prevention gap caused by the walls of the explosion prevention gap rubbing together on the other hand, the structural components forming the explosion prevention gap must be manufactured with especially small tolerances. Furthermore, it has been shown that, when the width of the explosion prevention gap is corrected after the manufacture of the electric motor, deformations can occur during the transport or assembly of the electric motor, which deformations can lead to a rubbing and/or a grinding of the walls of the explosion prevention gap.

Further, it is known to form an explosion prevention gap in a winding shape in the form of a lamellar seal. In such a design, not only the tolerances in the radial direction, but also the tolerances in the axial direction, must be precisely controlled for the correct dimensioning of explosion prevention gaps.

SUMMARY

It would therefore be desirable to provide a roller bearing assembly having an explosion prevention gap with a precisely-adjustable width that can be manufactured in a simple and cost-effective manner and is relatively insensitive to the tolerances of its component parts.

In one aspect of the present teachings, a roller bearing assembly includes at least one outer ring with a track, which is surrounded on its outer side by an outer part, and at least one inner ring with a track, which surrounds an inner part. The inner part is seated on a shaft and the inner part and the outer part project beyond the inner ring and the outer ring in an axial direction. An explosion prevention gap is formed between the inner part and the outer part. Preferably, the explosion prevention gap is at least substantially linear and cylindrical.

The roller bearing assembly may include a single- or multiple-rowed roller bearing, the inner ring and the outer ring. In one embodiment, the roller bearing assembly may be provided as a preassembled component with a explosion prevention gap having a predetermined width. In comparison to roller bearing assemblies, in which one wall of the explosion prevention gap is formed by the shaft itself, influences from tolerances of the shaft can be reduced or excluded. In comparison to labyrinth-like explosion prevention gaps, the manufacturing costs can be considerably reduced while maintaining the same precision. If the inner part and/or the outer part have at least one bore for supplying and/or draining of lubricant, it is also possible to lubricate the bearing unit (e.g., after its assembly) in spite of the effective explosion prevention and without opening the explosion prevention gap.

In another aspect of the present teachings, the roller bearing assembly may be equipped with at least one grease cartridge for supplying lubricant. The grease cartridge may be connected with the outer part or with the inner part.

In another aspect of the present teachings, the roller bearing assembly may comprise a mechanism or device, e.g., a wedge mechanism, for adjusting the width of the explosion prevention gap. Preferably, such a device enables the width to be precisely adjusted to a target value.

In another aspect of the present teachings, a deformation-sensitive portion of the inner part may be loosely-fit on the bearing shaft, while a less deformation-sensitive portion is press-fit on the bearing shaft. For example, the influence of the shaft tolerances on the explosion prevention gap can be minimized or excluded, e.g., if the portion of the inner part that is radially adjacent to the explosion prevention gap is loosely fit on the bearing shaft.

In another aspect of the present teachings, at least one wall of the explosion prevention gap is preferably formed from bronze, brass, copper or another non-ferrous metal. In case damage to the bearing or some other problem develops, a fail-safe operation is made possible by the explosion prevention gap without the danger of spark formation.

The explosion prevention feature of the present teachings can be further improved and the inflow of dirt into the roller bearing or the outflow of lubricant can be avoided, if the roller bearing assembly comprises at least one sealing element in the area of or adjacent to the explosion prevention gap.

Further, the roller bearing assembly can be advantageously utilized as a floating bearing, if the inner part has a friction-reducing coating on its inner side and/or the outer part has a friction-reducing coating on an outer side.

Further features, objects and advantages of the invention will be understood from the following description of exemplary embodiments and the appended claims.

DETAILED DESCRIPTION OF THE PREFERRED EMBODIMENTS

Each of the additional features and teachings disclosed below may be utilized separately or in conjunction with other features and teachings to provide improved roller bearings, as well as methods for designing, constructing and using the same. Representative examples of the present invention, which examples utilize many of these additional features and teachings both separately and in combination, will now be described in further detail with reference to the attached drawings. This detailed description is merely intended to teach a person of skill in the art further details for practicing preferred aspects of the present teachings and is not intended to limit the scope of the invention. Therefore, combinations of features and steps disclosed in the following detail description may not be necessary to practice the invention in the broadest sense, and are instead taught merely to particularly describe representative examples of the present teachings.

Moreover, the various features of the representative examples and the dependent claims may be combined in ways that are not specifically and explicitly enumerated in order to provide additional useful embodiments of the present teachings. In addition, it is expressly noted that all features disclosed in the description and/or the claims are intended to be disclosed separately and independently from each other for the purpose of original disclosure, as well as for the purpose of restricting the claimed subject matter independent of the compositions of the features in the embodiments and/or the claims. It is also expressly noted that all value ranges or indications of groups of entities disclose every possible intermediate value or intermediate entity for the purpose of original disclosure, as well as for the purpose of restricting the claimed subject matter.

Figure 1:
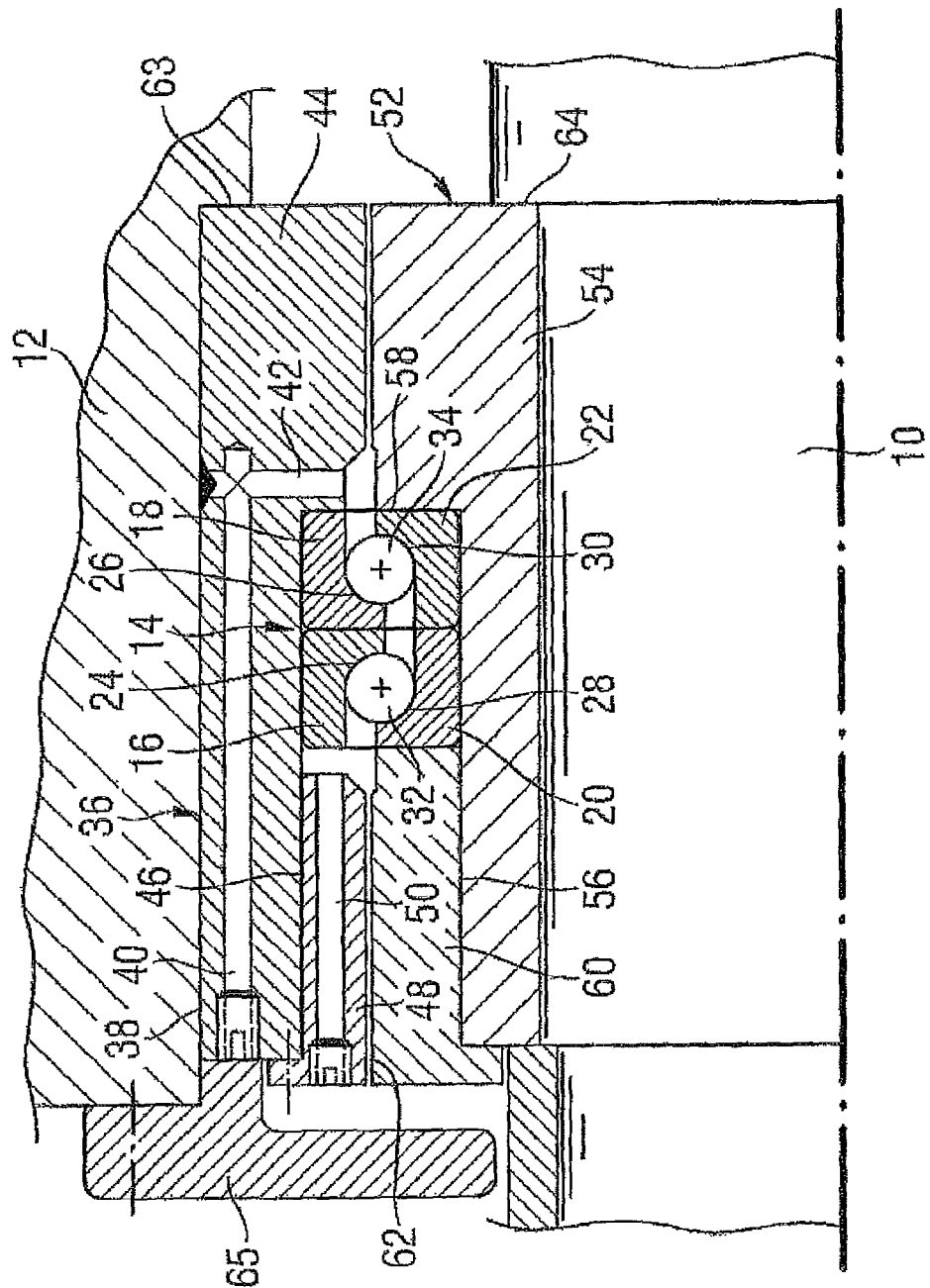
FIG. 1 shows a roller bearing assembly having a two-row ball bearing, an inner part and an outer part in a first representative embodiment.

FIG. 1 shows a roller bearing assembly having a shaft 10 that passes through an explosion-protected housing 12 of an electric motor. The roller bearing assembly comprises a two-row ball bearing 14 in an O-arrangement with two outer rings 16, 18 and two inner rings 20, 22. The outer rings 16, 18 each comprise an outer track 24, 26 and the inner rings 20, 22 each comprise an inner track 28, 30. Two ball rings 32, 34 move in the tracks 24, 26, 28, 30.

The outer rings 16, 18 are circumferentially surrounded by an outer part 36, which is may have a friction-reducing coating 38 on its radial outer side. The outer part 36 is inserted into a corresponding opening in the housing 12 of the motor. Lubricant from the ball bearing 14 can flow in and out via two bores 40, 42. The outer part 36 comprises a main body 44 having a cylindrical bore 46, into which the ball bearing 14 is inserted. A sealing sleeve 48 of the outer part 36 is inserted into the bore 46. A grease supply/drain bore 50 is defined in the sleeve 48. The bore 40 and the grease supply bore 50 can be sealed with a closing screw during the operation of the roller bearing or the grease supply bore 50 can be connected and/or can be integrated with a grease cartridge (not illustrated).

The inner rings 20, 22 of the ball bearing 14 are pushed onto a sleeve-shaped inner part 52 that is pushed onto the shaft 10. The inner part 52 comprises a main body 54 having a cylindrical outer surface 56, onto which the inner rings 20, 22 of the ball bearing 14 are pushed, and a ledge 58, on which the inner ring 22 of the ball bearing 14 abuts. Together with the ledge 58, a clamping sleeve 60 of the inner part 52 axially fixes the inner ring 20, 22. The cylinder surface-shaped radial outer side of the clamping sleeve 60 faces the cylinder surface-shaped radial inner side of the sealing sleeve 48 and together the sleeves 48, 60 define or enclose an explosion prevention gap 62 having a width that is, e.g., preferably, about 0.1 mm.

The roller bearing assembly axially abuts on a ledge 63 of the housing 12 and is pressed against the ledge 63 by a sealing cover 65 that is screwed together with the housing 12.

The explosion prevention gap 62, which is formed by the sealing sleeve 48 of the outer part 36 and the clamping sleeve 60 of the inner part 52, linearly extends in an axial direction of the roller bearing assembly and is cylindrical. The inner part 52 or the main body 54 of the inner part 52 is attached to the shaft 10 by a press-fit or snug-fit. The main body 54 of the inner part 52 abuts on a ledge 64 of the shaft 10. A sealing element optionally may be disposed in the area of the explosion prevention gap 62.

Figure 3:
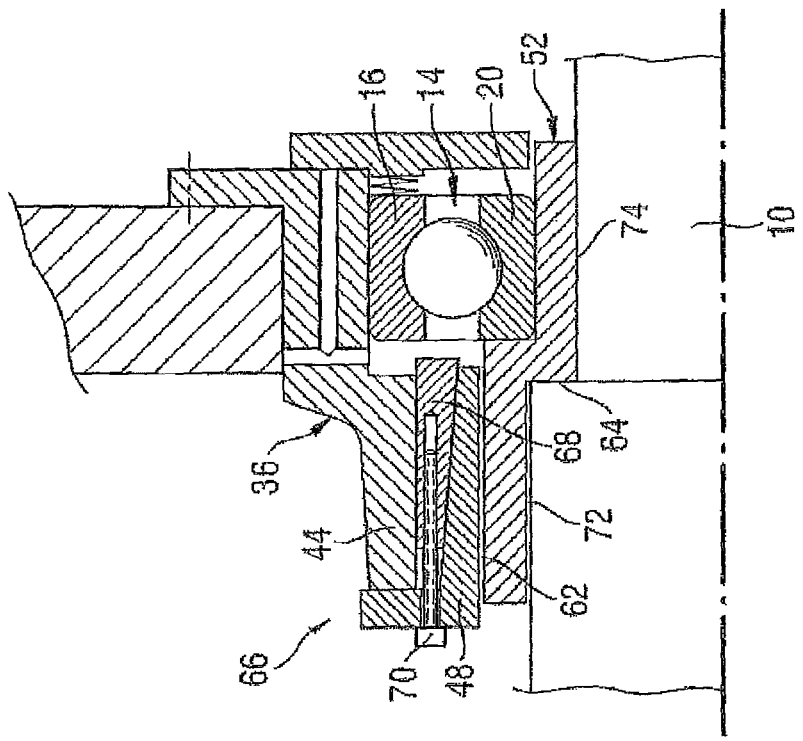
FIG. 3 shows a roller bearing assembly according to a third representative embodiment having a mechanism for adjusting the width of the explosion prevention gap.
Figure 2:
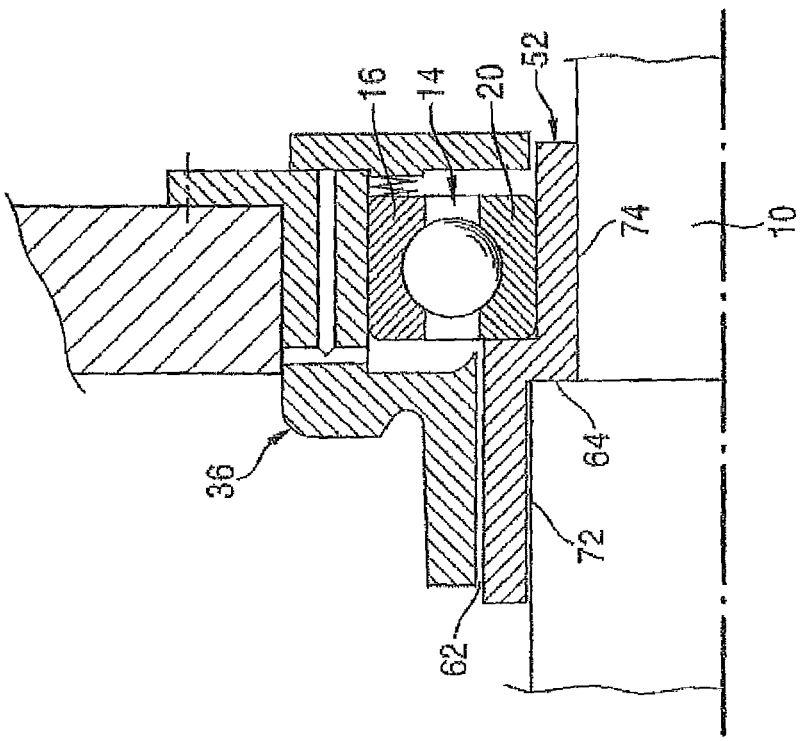
FIG. 2 shows a roller bearing assembly having an explosion prevention gap according to a second representative embodiment of the invention, which has a pre-set gap width.

FIGS. 2 and 3 show further embodiments of the present teachings. In order to avoid repetition, the following description is generally limited to the differences as compared to the exemplary embodiment illustrated in FIG. 1, wherein reference is made to the description of FIG. 1 with respect to the unchanged features. Similar features are provided with the same reference numerals.

FIG. 2 shows an alternative embodiment having a ball bearing 14 and an inner part 52 that is mounted on the shaft 10 with a snug-fit or a press fit 74. An explosion prevention gap 62 is formed between an inner part 52, which is surrounded by an inner ring 20 of the ball bearing 14, and an outer part 36, which surrounds an outer ring 16 of the ball bearing 14. In this particular embodiment, the width of the gap 62 is pre-set or predetermined at the time of assembly.

The inner part 52 abuts on a ledge 64 of the shaft 10. The larger part of the explosion prevention gap 62 lies rearward of the ledge 64 as viewed from the ball bearing 14, i.e. towards the left in FIG. 2. Rearward of the ledge 64 (i.e. to the left of the ledge 64 in FIG. 2), the inner part 52 is attached to the shaft 10 in a loose sliding fit, so that the inner part 52 will not deform in this area due to a defective fit on the shaft 10, e.g., if the tolerances for the shaft 10 or inner part 52 do not meet specifications. As a result of this loose-fit, a narrowing of the explosion prevention gap 62 can be avoided when the diameter of the shaft 10 does not meet specification tolerances.

Optionally, the inner ring 20 of the ball bearing 14 may be integrally formed with the inner part 52. In this case, the inner track(s) are formed directly on the inner part 52. In addition or in the alternative, the outer ring(s) 16, 18 may be omitted and the outer track(s) may be formed directly on the outer part 36.

FIG. 3 shows a further embodiment that includes a mechanism or device 66 for adjusting the width of the explosion prevention gap 62. The outer part 36 comprises a main body 44 and a sealing sleeve 48. The radially outer side of the sealing sleeve 48 narrows in a conical manner in the direction of the ball bearing 14. A ring 68 is disposed between the main body 44 and the sealing sleeve 48. The radially inner side of the ring 68 narrows in a conical manner in correspondence to the conical outer side of the sealing sleeve 48. The position of the ring 68 in the axial direction can be adjusted by screw 70. By varying the axial position of the ring 68, the diameter of the sealing sleeve 48 and thus the width of the explosion prevention gap 62 can be varied. The sealing sleeve 48 can have one or more axially-extending gaps distributed around its circumference, which gaps make possible such a variation of the diameter.

In all embodiments of the present teachings, one or both walls of the explosion prevention gap 62 can be formed from non-ferrous metal such as, e.g., brass, bronze or copper. In case of bearing damage, a fail-safe operation can be made possible thereby and spark formation can be avoided.

The invention claimed is:

1. A roller bearing assembly comprising:
   an electric motor housing having an opening through a wall of the housing;
   at least one outer ring having an outer track,
   an outer part in the opening radially between the housing and the outer track, the outer part surrounding an outer side of the at least one outer ring,
   at least one inner track opposite of the outer track,
   an inner part surrounded by the at least one inner track, and
   a shaft disposed within the inner part, the inner part extending radially between the inner track and the shaft,
   wherein the inner part and the outer part project in an axial direction of the shaft beyond the inner track and the outer ring, so that an explosion prevention gap is defined between the inner part and the outer part, the explosion prevention gap being at least substantially linear and cylindrical and having an axial length and a radial width selected such that sparks inside the housing cannot ignite gases outside the housing.

2. A roller bearing assembly according to claim 1, further comprising at least one bore defined in at least one of the inner part and the outer part, the at least one bore being configured to supply lubricant to a space between the inner and outer tracks.

3. A roller bearing assembly according to claim 2, further comprising at least one grease cartridge in fluid communication with the at least one bore.

4. A roller bearing assembly according to claim 3, further comprising a device configured to adjust a width of the explosion prevention gap.

5. A roller bearing assembly according to claim 4, wherein the inner part is press-fit onto the shaft radially adjacent to the inner track.

6. A roller bearing assembly according to claim 5, wherein the inner part is loosely-fit on the shaft radially adjacent to the explosion prevention gap.

7. A roller bearing assembly according to claim 6, wherein at least a portion of at least one of the inner part and the outer part radially adjacent to the explosion prevention gap is formed from a non-ferrous metal.

8. A roller bearing assembly according to claim 7, wherein the non-ferrous metal is selected from copper, bronze and brass.

9. A roller bearing assembly according to claim 8, wherein a friction-reducing coating is provided on at least one of an inner side of the inner part and an outer side of the outer part.

10. A roller bearing assembly according to claim 1, further comprising at least one sealing element disposed adjacent to the explosion prevention gap.

11. A roller bearing assembly according to claim 1, further comprising a device configured to adjust a width of the explosion prevention gap.

12. A roller bearing assembly according to claim 1, wherein the inner part is press-fit onto the shaft radially adjacent to the inner track.

13. A roller bearing assembly according to claim 12, wherein the inner part is loosely-fit on the shaft radially adjacent to the explosion prevention gap.

14. A roller bearing assembly according to claim 1, wherein at least a portion of at least one of the inner part and the outer part radially adjacent to the explosion prevention gap is formed from a non-ferrous metal.

15. A roller bearing assembly according to claim 14, wherein the non-ferrous metal is selected from copper, bronze and brass.

16. A roller bearing assembly according to claim 1, wherein a friction-reducing coating is provided on at least one of an inner side of the inner part and an outer side of the outer part.

17. A roller bearing assembly according to claim 1, including at least one roller body, wherein the inner track and the outer track and the at least one roller body comprise an angular contact bearing.

18. A roller bearing assembly according to claim 1, wherein a radially inner wall of the outer part forms a first wall of the explosion prevention gap and a radially outer wall of the inner part forms a second wall of the explosion prevention gap.

19. A roller bearing assembly comprising:
a housing of an electric motor having an opening through a wall of the housing;
an outer ring having an outer track,
an outer part in the opening in the housing and surrounding the outer track,
an inner track opposite of the outer track,
an inner part surrounded by the inner track,
a rotatable shaft disposed within the inner part, the inner part extending radially between the inner track and the shaft, and
a plurality of roller bearings disposed between the inner track and the outer track,
wherein the inner part and a portion of the outer part axially extend past the inner track and the outer ring and define an explosion prevention gap between the inner part and the outer part that is axially adjacent to the inner track and outer track, the explosion prevention gap being at least substantially linear and cylindrical and having an axial length and a radial width selected such that sparks inside the housing cannot ignite gases outside the housing.

20. A roller bearing assembly according to claim 19, further comprising a width-adjusting device disposed in the explosion prevention gap.

21. A roller bearing assembly according to claim 19, wherein the inner part is press-fit onto a shaft radially adjacent to the inner track and the inner part is loosely-fit on the shaft radially adjacent to the explosion prevention gap.

22. A roller bearing assembly according to claim 19, wherein at least a portion of at least one of the inner part and the outer part adjacent to the explosion prevention gap is formed from a non-ferrous metal selected from copper, bronze and brass, a friction-reducing coating is provided on at least one of an inner side of the inner part and an outer side of the outer part and at least one bore is defined in at least one of the inner part and the outer part, the at least one bore being configured to supply lubricant to the roller bearings.

23. A roller bearing assembly according to claim 19, wherein a radially inner wall of the outer part forms a first wall of the explosion prevention gap and a radially outer wall of the inner part forms a second wall of the explosion prevention gap.

24. A roller bearing assembly comprising:
a housing of an electric motor, the housing having an opening in a wall, the opening having an inner side wall;
a shaft extending through the opening in the housing and having an outer side wall spaced from the inner side wall;
an outer part in the opening surrounding the shaft and having an outer side engaging the inner side wall and having an inner side;
an inner part surrounding the shaft and having an outer side facing the inner side of the outer part;
an outer ring on the inner side of the outer part and having an outer track; and
an inner ring on the outer side of the inner part and having an inner track;
wherein an axial outer portion of the outer part projects beyond the outer ring in an axial direction of the shaft and an axial outer portion of the inner part projects beyond the inner ring in the axial direction of the shaft, the axial outer portion of the outer part and the axial outer portion of the inner part defining therebetween an explosion prevention gap having an axial length substantially greater than a radial width and configured such that sparks generated inside the housing cannot traverse the axial length of the explosion prevention gap, the explosion prevention gap being at least substantially linear and cylindrical.

25. A roller bearing according to claim 24, wherein the outer part comprises a sealing sleeve on the axial outer portion of the outer part, wherein the inner part comprises a clamping sleeve on the axial outer portion of the inner part, and wherein the explosion prevention gap is defined between the sealing sleeve and the clamping sleeve.

26. A roller bearing according to claim 25, wherein the outer part includes a central portion radially between the housing and the outer ring, wherein the inner part includes a central portion radially between the shaft and the inner ring, wherein the outer part includes an axial inner portion having a radial width greater than a radial width of the outer part central portion and forming an outer shoulder with the outer part central portion, wherein the inner part includes an axially inner portion having a radial width greater than a radial width of the inner part central portion and forming an inner shoulder with the inner part central portion, wherein the outer ring is located axially between the sealing sleeve and the outer shoulder and wherein the inner ring is located axially between the clamping sleeve and the inner shoulder.

27. A roller bearing according to claim 26, wherein the sealing sleeve includes a flange overlying an axially outer end of the outer part and wherein the clamping sleeve includes a flange overlying an axially outer end of the inner part.

28. A roller bearing assembly according to claim 24, wherein a radially inner wall of the axially outer portion of the outer part forms a first wall of the explosion prevention gap and a radially outer wall of the axially outer portion of the inner part forms a second wall of the explosion prevention gap.

* * * * *